(12) United States Patent
Yoshino

(10) Patent No.: US 7,924,656 B2
(45) Date of Patent: Apr. 12, 2011

(54) INFORMATION COMMUNICATION TERMINAL WITH ACCELERATION SENSOR

(75) Inventor: Yukiko Yoshino, Saitama (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 12/374,943

(22) PCT Filed: Jul. 17, 2007

(86) PCT No.: PCT/JP2007/064097
§ 371 (c)(1), (2), (4) Date: Jan. 23, 2009

(87) PCT Pub. No.: WO2008/015906
PCT Pub. Date: Feb. 7, 2008

(65) Prior Publication Data
US 2009/0262607 A1 Oct. 22, 2009

(30) Foreign Application Priority Data

Aug. 4, 2006 (JP) ................. 2006-213359

(51) Int. Cl.
*G04B 23/02* (2006.01)
*G08B 23/00* (2006.01)
(52) U.S. Cl. ................ 368/244; 340/669; 368/11
(58) Field of Classification Search .......... 368/107–109, 368/11; 340/669
See application file for complete search history.

(56) References Cited

U.S. PATENT DOCUMENTS

| | | | |
|---|---|---|---|
| 4,352,170 A | 9/1982 | Jetter | |
| 4,430,006 A * | 2/1984 | Jetter | 368/73 |
| 4,585,358 A | 4/1986 | Shay | |
| 5,189,648 A * | 2/1993 | Cooper et al. | 368/73 |
| 6,992,580 B2 * | 1/2006 | Kotzin et al. | 340/539.11 |
| 7,606,552 B2 * | 10/2009 | Orr et al. | 455/343.1 |
| 7,633,836 B2 * | 12/2009 | Choi et al. | 368/11 |
| 2004/0066302 A1 * | 4/2004 | Menard et al. | 340/669 |
| 2006/0082543 A1 | 4/2006 | Van Lydegraf et al. | |
| 2008/0001770 A1 * | 1/2008 | Ito et al. | 340/669 |
| 2008/0084319 A1 * | 4/2008 | Fan | 340/575 |
| 2008/0108340 A1 * | 5/2008 | Karstens | 455/418 |
| 2008/0259742 A1 * | 10/2008 | Tadanori | 368/263 |
| 2009/0153342 A1 * | 6/2009 | Thorn | 340/669 |
| 2009/0164219 A1 * | 6/2009 | Yeung et al. | 704/258 |

FOREIGN PATENT DOCUMENTS

| | | |
|---|---|---|
| JP | 1993087952 A | 4/1993 |
| JP | 3053356 U | 8/1998 |
| JP | 2002296376 A | 10/2002 |
| JP | 2006121395 A | 5/2006 |
| JP | 2007166474 A | 6/2007 |
| KR | 20040083569 A | 10/2004 |

OTHER PUBLICATIONS

Supplementary European Search Report for EP 07 79 0859 completed Apr. 8, 2010.

* cited by examiner

Primary Examiner — Sean Kayes

(57) ABSTRACT

An information communication terminal with a report function for use in the alarm includes the report function for awakening. However, since an operation required to stop the report function is performed in an operation unit, there is a risk that the user who is not in wakefulness makes an operation error. Using the information communication terminal including a sensor capable of detecting that the information communication terminal is shaken, a notification operation at a set time in the report function is controlled. Also, a control unit of the information communication terminal performs various kinds of control for the notification operation by partitioning vibration information detected by this sensor according to various patterns.

12 Claims, 7 Drawing Sheets

F I G. 1
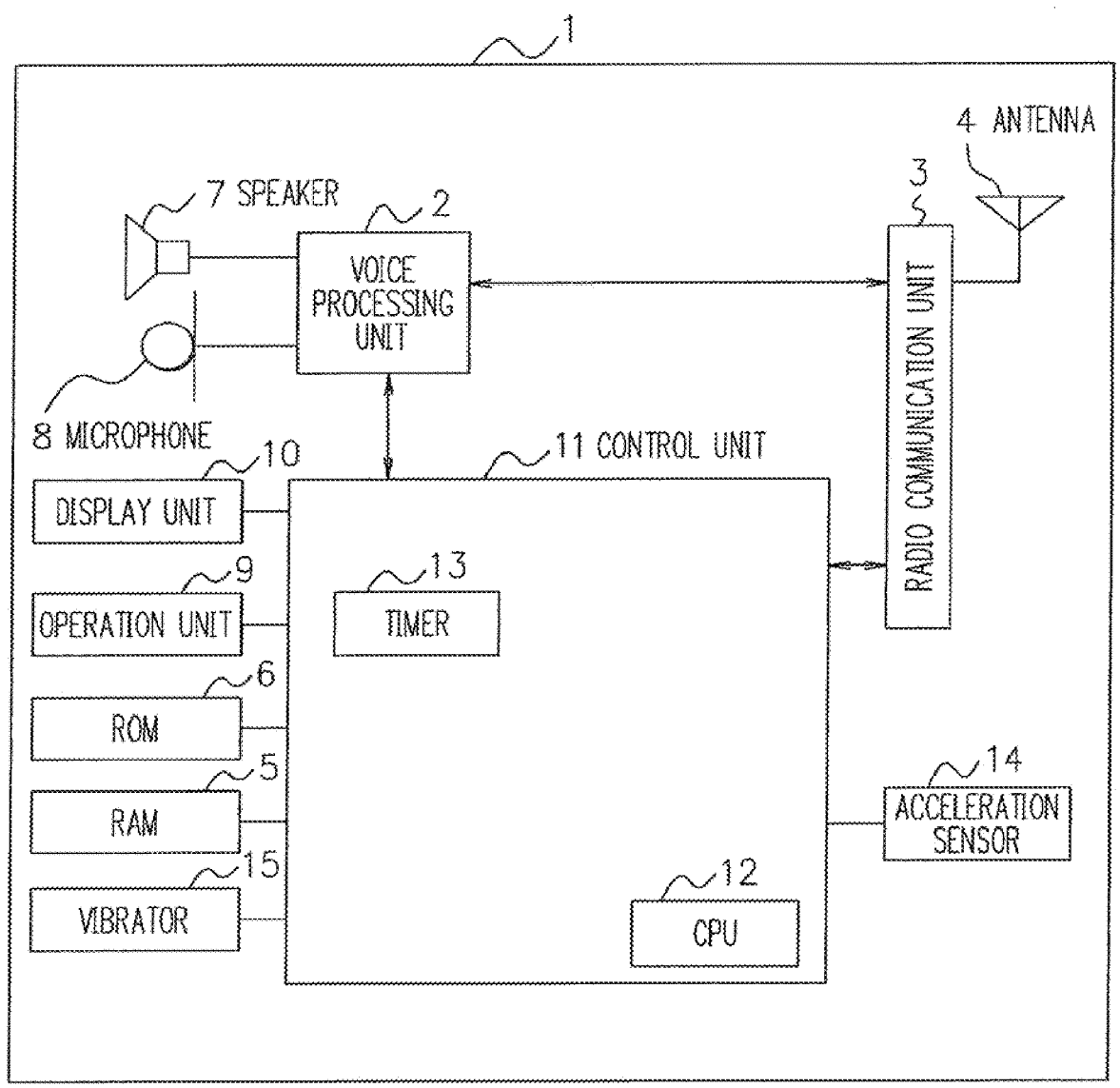

F I G. 3

(a)

| PRESENCE OR ABSENCE OF VIBRATION | ○ | ● | ● | ● | ○ | ○ | ○ | | | | | | | | |
|---|---|---|---|---|---|---|---|---|---|---|---|---|---|---|---|
| COUNT | 0 | 1 | 2 | 3 | 0 | 0 | | | | | | | | | |
| STATE | | | | ▨ | ⋰ | ⋰ | ⋰ | | | | | | | | |

STOP OF NOTIFICATION OPERATION AND RE-NOTIFICATION SETTING (b)

| PRESENCE OR ABSENCE OF VIBRATION | ○ | ● | ● | ● | | | | | | | | | | | |
|---|---|---|---|---|---|---|---|---|---|---|---|---|---|---|---|
| COUNT | 0 | 1 | 2 | 3 | | | | | | | | | | | |
| STATE | | | | ▨ | | | | | | | | | | | |

CANCEL OF RE-NOTIFICATION SETTING (c)

| PRESENCE OR ABSENCE OF VIBRATION | ○ | ● | ● | ● | ● | ● | | | | | | | | | |
|---|---|---|---|---|---|---|---|---|---|---|---|---|---|---|---|
| COUNT | 0 | 1 | 2 | 3 | 4 | 5 | | | | | | | | | |
| STATE | | | | | | ▨ | | | | | | | | | |

STOP OF NOTIFICATION OPERATION AND STOP OF REPORT FUNCTION

F I G. 7
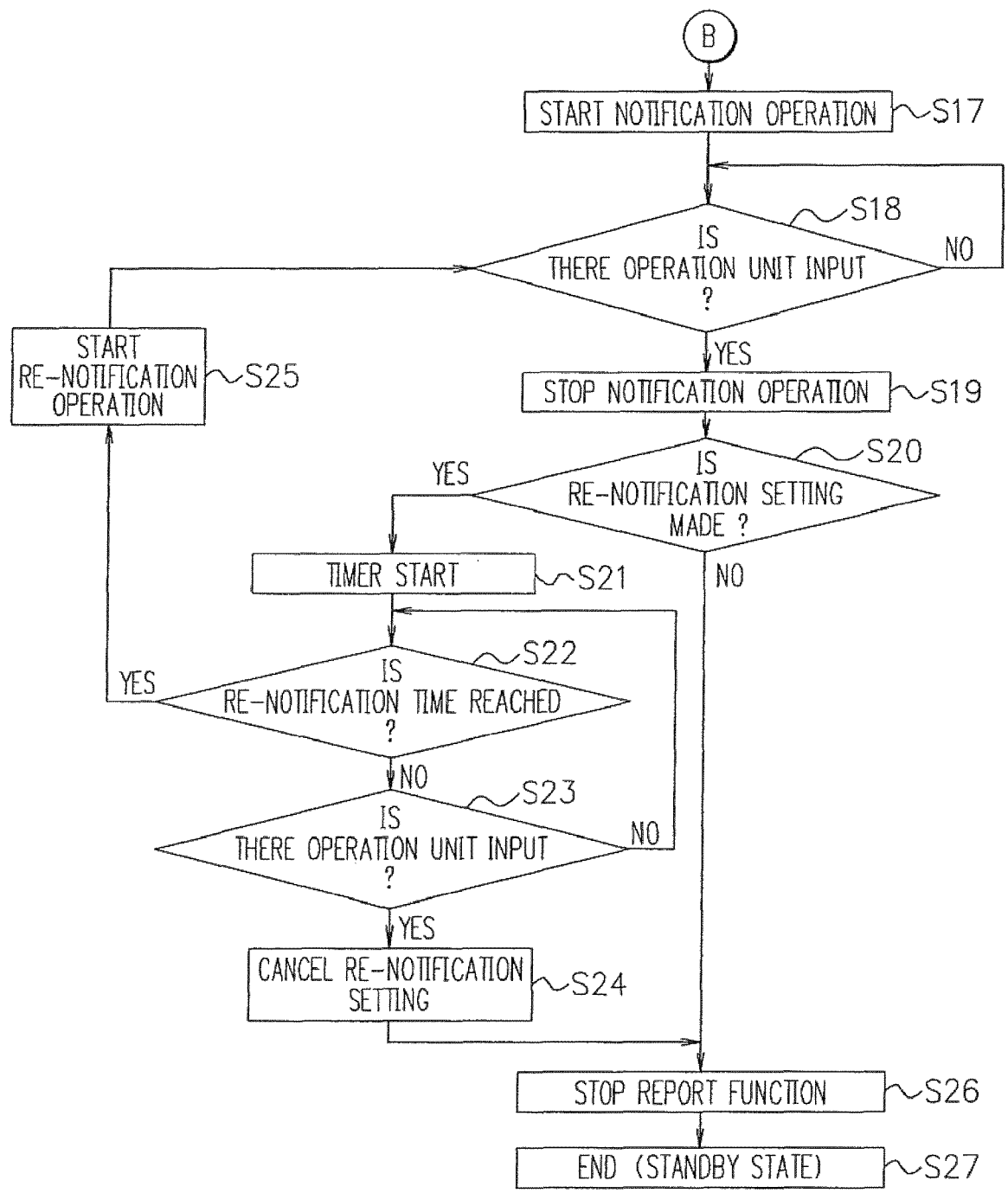

INFORMATION COMMUNICATION TERMINAL WITH ACCELERATION SENSOR

TECHNICAL FIELD

The present invention relates to an information communication terminal with an acceleration sensor that can control a report function using the acceleration sensor provided for the information communication terminal, and a report function control method with the acceleration sensor.

BACKGROUND ART

With the remarkable development of information communication technologies in recent years, it is common that an information communication terminal comprises a report function.

This report function involves making a notification operation with rumbling using a predetermined alarm sound and vibration at a preset time for awakening, for example. To stop this notification operation, the user needs to perform a stop process via an operation unit at an information communication terminal.

For example, to stop the report by driving a speaker or vibrator, the user may be requested to input any key on the operation unit.

In this case, a method has been disclosed in which if the key press time is longer than or equal to a predetermined time, the report is stopped, but if the key is not held down until the report is stopped, a re-report is made after a certain time (refer to patent document 1).

Patent document 1: Japanese Patent Laid Open Publication No. 2002-296376

DISCLOSURE OF THE INVENTION

Problems to be Solved by the Invention

However, since the stop process by operating the operation unit is a fingertip operation for the user, or a simple operation, it is often difficult to become in a wakefulness state completely.

Also, if the user who does not fully awaken or the user with the eyes closed tries to operate the operation unit in the information communication terminal to stop the report, there is a risk that an operation error is caused. In particular, there are cases to embroil others by calling or sending mail to innocent others.

Therefore, the invention has been achieved in the light of the above-mentioned circumstances, and it is an exemplary object of the invention to provide a report function control method and an information communication terminal with the control method that is more effective for a user to awaken by making the report function control method of the information communication terminal more intricate, for example.

Means for Solving the Problems

The present invention provides an information communication terminal with an acceleration sensor including acceleration detection means for detecting vibration occurring on the information communication terminal to generate vibration information, timing means for detecting presence or absence of reaching a predetermined time, notification means for performing a predetermined notification operation at the predetermined time, and control means for controlling the notification means by receiving the vibration information, wherein the control means receiving a notification of reaching the predetermined time from the timing means instructs the notification means to perform the notification operation, and stops the notification operation based on the vibration information generated by the acceleration detection means during execution of the notification operation.

Also, the invention provides a report function control method including, for an information communication terminal with a sensor for detecting vibration occurring on the information communication terminal to generate vibration information, performing a notification operation as a report function when a predetermined time is reached, and stopping the notification operation if a control unit of the information communication terminal detects specific first vibration information during execution of the notification operation.

ADVANTAGES OF THE INVENTION

The information communication terminal according to the invention includes acceleration detection means for detecting vibration occurring on an information communication terminal to generate vibration information, timing means for detecting presence or absence of reaching a predetermined time, notification means for performing a predetermined notification operation at the predetermined time, and control means for controlling the notification means by receiving the vibration information. And the control means stops the notification operation based on the vibration information generated by the acceleration detection means during execution of the notification operation. Accordingly, in the information communication terminal, it is possible to control the notification operation with the notification means because the acceleration detection means detects the vibration generated by the user shaking the information communication terminal as the vibration information.

Also, as control with the acceleration detection means, the user is obliged to perform a specific operation of shaking the information communication terminal, whereby it is easier for the user to perform the operation, and it is possible to avoid an operation error and enhance an awakening effect.

BEST MODE FOR CARRYING OUT THE INVENTION

A constitution of an exemplary embodiment of the present invention will be described below with reference to drawings.

The exemplary embodiment of the invention will be described below with reference to the drawings.

First of all, an information communication terminal with an acceleration sensor function including a report function according to the exemplary embodiment of the invention will be described below.

FIG. 1 is a block diagram showing a configuration example of an information communication terminal 1 (hereinafter referred to as a terminal) with an acceleration sensor including a report function according to the exemplary embodiment of the invention.

In FIG. 1, the terminal 1 comprises a control unit 11 including a CPU 12 for controlling functions of the terminal 1 and a timer 13, a radio communication unit 3 connectable to a network, not shown, via an antenna 4, a memory (RAM: Random Access Memory) 5 for storing telephone directory data, mail data or the like for use during a normal operation of the terminal 1, and a memory (ROM: Read Only Memory) 6 for storing a computer program of instructing the operation of the terminal 1. Also, the information communication terminal 1 comprises a speaker 7 for making voice output to a user for calling, a microphone 8 for receiving voice input into the terminal 1, and an acceleration sensor 14 for detecting shaking or vibration occurring on the terminal 1 and notifying vibration information to the control unit 11. Further, the terminal 1 comprises an operation unit 9 for accepting user's input from a keypad or the like, and a display unit 10 that can display various kinds of information such as received mail information or image.

The CPU 12 of the control unit 11 controls each part as will be described later by operating under the computer program stored in the ROM 6 based on count information received from the timer 13.

The terminal 1 includes a report function of making the notification operation to invite the user's attention by rumbling from the speaker or vibration of a vibrator 15 at a preset time stored in the memory (RAM) 5. This report function is one in which the control unit 11 monitors the time using the timer 13 and performs the notification operation for a fixed period if the set time is reached. If there is the user's input of instructing the stop of notification in the meanwhile, the notification operation is stopped or temporarily suspended.

After the temporary suspension, if there is a re-notification setting (typically referred to as a snooze setting) for performing the notification operation again after the temporary suspension, the control unit 11 performs the notification operation again after a certain time stored in the memory (RAM) 5 and repeats this process unless the re-notification setting is canceled.

For this re-notification setting, the control unit 11 accepting the input of stopping the re-notification setting from the user can stop the re-notification setting before performing the notification operation.

And if the control unit 11 cancels the re-notification setting, the report function is ended.

There are following two control methods for the notification operation and the re-notification setting.

One of the methods is a normal operation unit input mode for accepting a specific input from the operation unit 9 to stop the notification operation, and the other is a vibration input mode for detecting the vibration occurring on the terminal 1, using the acceleration sensor 14 included in the terminal 1, to control the notification operation.

In a case where the control method for the notification operation of the terminal 1 is the vibration input mode of shaking the terminal 1 to stop the operation, the control unit 11 performs the notification operation and activates the acceleration sensor 14 for detecting the vibration and shaking when the specific time (set time) registered in the RAM 5 is reached.

Conversely, if the notification operation is controlled in the operation unit input mode of stopping the notification operation by making a predetermined input operation into the operation unit 9, not the vibration input mode of shaking the terminal 1, this acceleration sensor 14 is not activated. Instead, the control unit 11 monitors whether or not there is any specific input into the operation unit 9. Therefore, even in a condition where the specific input into the operation unit 9 is recognized, and the terminal 1 is vibrating, the vibration occurring in making the input into the operation unit 9 cannot be detected.

Referring to FIGS. 2, 3 and 4, the notification operation with the report function of the terminal 1 and a process required for stopping the notification operation in the exemplary embodiment of the invention will be described below.

First of all, the user sets the report function of the terminal 1.

FIG. 2A is an image view showing a setting screen 16 for making various settings of the report function, and FIG. 2B is an image view showing the setting screen 16 for selecting a mode designating the control method for the notification operation.

As shown in FIG. 2A, various settings of the report function on the setting screen 16 include a set time (12:00 in FIG. 2A), a "presence or absence of repetition" of registering the notification operation to be performed, for example, at a predetermined time everyday, a "time alarm sound" of setting the kind of alarm sound used in the notification operation or the presence or absence of using the vibrator, a "level" of rumbling strength associated with the notification operation, and a "presence or absence of snooze notification" indicating the re-notification setting.

In this "presence or absence of snooze notification", a "notification time interval" that is the time from the stop of the notification operation till the re-notification for making the notification again as the re-notification setting, though not shown in FIG. 2A, can be also set.

Various settings of the report function are registered in the RAM 5.

Seeing this setting screen 16, the user selects the set time or the mode for stopping the notification operation using the operation unit 9.

For example, the operation unit input mode designating an "alarm stop with button operation" in FIG. 2B indicates the mode of stopping the notification operation with the input from the operation unit 9, namely the normal mode of stopping the alarm rumbling.

In contrast to this operation unit input mode, the vibration input mode designating the "alarm stop by shaking" indicates the mode of stopping the notification operation such as alarm rumbling by shaking the terminal 1.

In this vibration input mode, the control unit 11 controls the report function by receiving not only the presence or absence of generating vibration information notified from the acceleration sensor 14, but also the notification of time information of counting by the timer 13, detecting the information on the time and count (vibration pattern) for which the detected vibration information is continued, and comparing the detected information and the setting information (setting pattern) stored in the RAM 5.

That is, the control unit 11 makes an instruction to stop the notification operation based on the vibration pattern and the setting pattern, or if there is the re-notification setting, temporarily suspend the notification operation, and continue to monitor with the timer 13 until the certain time of the notification time interval passes.

Referring to FIG. 3, this vibration pattern will be described below.

FIGS. 3 and 4 are image views showing the operation and state during detection of vibration in the vibration input mode before and after the setting time. Particularly, FIGS. 3A to 3C are image views showing the operation and state corresponding to a setting pattern of canceling the notification operation and the re-notification setting, and FIGS. 4A to 4D are image views showing the various actual operations and states.

In FIGS. 3A to 3C and FIGS. 4A to 4D, the presence or absence of vibration information generated at every second by the acceleration sensor 14 is shown as the circle mark at upper column in each image view. That is, the white circle mark is provided in a so-called non-reactive state where the acceleration sensor 14 does not generate the vibration information, or the black circle mark is provided if the acceleration sensor 14 generates the vibration information. Particularly, a sequence of signals indicating one series of the presence or absence of vibration information in FIGS. 3A to 3C is recorded as the setting pattern in the memory (RAM) 5.

The number as indicated at the middle column shows the time (second), for example, as the time elapsed, in which when the vibration information is generated, the count is started, and while it continues to be generated, the count is up as the time elapsed. Therefore, as shown in FIGS. 4B and 4C, for example, when the vibration information can not be detected (white circle mark), the control unit 11 once resets the timer 13 and starts to count up again during the notification operation, or during the re-notification setting.

The line as indicated at the bottom column, the oblique line part indicates a state where the control unit 11 performs the notification operation, the dotted line part indicates a state where the re-notification setting is performed, and the blank part indicates a state where neither the notification operation nor the re-notification setting are performed and the report function is stopped.

Thereby, the image views of FIGS. 3 and 4 can show the time when the vibration information is generated, the time when it is not generated, the respective duration state and the corresponding execution content of the control unit 11.

FIG. 3A shows the operation and state of stopping the notification operation, FIG. 3B shows the operation and state of canceling the re-notification setting, and FIG. 3C shows the operation and state of stopping the notification operation when the re-notification setting is not made.

As shown in FIG. 3A, the control unit 11 that has detected the vibration information (first vibration information) generated for three seconds or more continuously stops the notification operation and transits to a state of the re-notification setting that is originally set. Also, as shown in FIG. 3B, if the vibration information (second vibration information) generated for three seconds or more continuously is detected during the re-notification setting, the control unit 11 cancels the re-notification setting and executes a process of stopping the report function.

Further, as shown in FIG. 3C, if the acceleration sensor 14 detects the vibration information (third vibration information) generated for five seconds or more continuously, for example, while the control unit 11 is performing the notification operation, in the state where the re-notification setting is not originally set, the control unit 11 performs a process for stopping the notification operation and stopping the report function.

These setting patterns may be changed on the screen of FIGS. 2A and 2B by the user, and FIGS. 3A to 3C are only illustrative.

Subsequently, various kinds of vibration information actually generated, and the control contents of the report function performed based on the vibration information will be described below using FIGS. 4A to 4D.

The vibration input mode in the exemplary embodiment of the invention will be described below in the case of FIG. 4A, for example.

First of all, the control unit 11 activates the acceleration sensor 14 immediately after the set time, if the re-notification setting is inputted on the screen of FIG. 2A. Thereafter, the control unit 11 stops the notification operation and transits to the re-notification setting if the vibration information is detected for three seconds or more continuously. Subsequently, after transition to the re-notification setting, if the vibration information from the acceleration sensor 14 is detected for three seconds or more continuously, the control unit 11 cancels the re-notification setting, and ends execution of the report function (FIG. 4A). That is, the user needs to shake the terminal 1 for at least six seconds or more to stop both the notification operation and the re-notification setting.

For example, as shown in FIG. 4B, if the control unit 11 can not detect the vibration information for three seconds or more during execution of the notification operation, the control unit does not stop the notification operation indefinitely.

Also, as shown in FIG. 4C, even though the user can stop the notification operation by shaking the terminal 1 for three seconds or more, as the vibration information duration time required for stopping the notification operation, the control unit 11 of the terminal 1 does not cancel the re-notification setting indefinitely, if the user ceases shaking the terminal 1 after transition to the re-notification setting.

Also, as shown in FIG. 4D, in the case where there is no re-notification setting, the control unit 11 does not stop the notification operation if it can not detect the input of vibration information for five seconds or more, as in FIG. 3C, and stops the notification operation and the report function, only if it detects the input of vibration information for five seconds or more.

The vibration patterns as described here and shown in FIGS. 4A to 4D are illustrative, and the control unit 11 controls the operation in accordance with the content of the setting pattern registered in the RAM 5, in which the user can freely change the setting. Therefore, if the setting pattern is different even with the same vibration pattern, the control substance performed by the control unit 11 is different.

Referring to FIG. 1 and FIGS. 5 to 7, a process for performing the report function of the terminal 1 according to the exemplary embodiment of the invention will be described below.

FIGS. 5 to 7 are flowcharts showing the process for performing the report function of the terminal 1.

The control unit 11 instructs the speaker 7 and the vibrator 15 to perform the notification operation at the set time. Herein, when the notification operation is performed, the control unit 11 monitors the operation unit 9 in the operation input mode, or monitors the vibration information with the acceleration sensor 14 in the vibration input mode.

First of all, in a standby state, the control unit 11 of the terminal 1 checks whether or not the report function is actually set (step S1: S is hereinafter omitted in the figure).

If the report function is not set, the operation proceeds to the original standby state (step 26).

Herein, if the report function is set, the control unit 11 of the terminal 1 checks whether the mode is the vibration detection mode or the operation unit input mode (step 2).

In the vibration detection mode (YES at step 2), the operation proceeds to the flow (FIG. 6) for controlling the notification operation in the vibration detection mode, or in the operation unit input mode (NO at step 2), the operation proceeds to the flow (FIG. 7) for controlling the notification operation corresponding to the operation unit input mode.

When the report function in the vibration detection mode is performed, the control unit 11 monitors the detection of the presence or absence of reaching the set time, using the timer 13.

If the set time is not reached, the control unit 11 continues the monitoring (NO at step 3), but if the report set time is reached (YES at step 3, hereinafter continuing to step 4 in FIG. 6), the control unit 11 performs the notification operation (step 4), and activates the acceleration sensor 14 (step 5).

Thereafter, the control unit 11 monitors the presence or absence of vibration information from the acceleration sensor 14, and continues to monitor the presence or absence of generating the vibration information again if the user's operation of shaking the terminal 1 is not detected by the acceleration sensor 14 (NO at step 6).

If the vibration is detected by the acceleration sensor 14 (YES at step 6), the vibration information is generated and notified to the control unit 11.

The control unit 11 compares the detected vibration pattern and the setting information stored in the memory (RAM) 5, for example, the setting pattern (first vibration information) of stopping the notification operation corresponding to the state as indicated in FIG. 3A, and confirms the presence of absence of a match. If there is a match (YES at step 7), the control unit 11 regards it as an instruction of stopping the notification operation, and stops the notification operation (step 8). However, if the vibration information does not conform with the notification operation stop pattern (NO at step 7), the control unit 11 does not stop the notification operation and monitors the presence or absence of vibration information again (step 6).

After the notification operation is stopped (step 8), the control unit 11 checks whether or not the re-notification setting is made based on various settings of the report stored in the RAM 5 (step 9). If the re-notification setting is not made at the terminal 1 (NO at step 9), the control unit 11 ends the report function (step 26), and returns to the standby state (END).

On the other hand, if the re-notification setting is made at the terminal 1 (YES at step 9), the control unit 11 transits to the re-notification setting, and monitors the notification time interval of making the re-notification using the timer 13 (step 10). Also, the control unit 11 monitors the presence or absence of generating the vibration information with the acceleration sensor 14 during the re-notification setting. If the set time specified for the notification time interval is reached (YES at step 11) during the re-notification setting, the control unit 11 performs the notification operation for re-notification again (step 15), and monitors the detection of presence or absence of vibration for stopping the notification operation with the acceleration sensor 14 (from step 6 to step 14).

Even if the set time specified for the notification time interval is not reached (NO at step S11), the control unit 11 monitors the presence or absence of generating the vibration information from the acceleration sensor 14. If the vibration information is generated (YES at step 12), the control unit 11 checks whether or not the vibration information is matched with the setting pattern (second vibration information) corresponding to the state as indicated in FIG. 3B, for example (step 13).

If there is a match (YES at step 13), the control unit 11 ends the report function by canceling the re-notification setting (step 26), and returns to the standby state.

If the vibration information is not generated at step 12 (NO at step 12), or if the vibration information is generated but not matched with the appropriate vibration pattern (setting pattern corresponding to the state of FIG. 3B) (NO at step 13), the operation returns to step 11 again, whereby the control unit monitors the presence or absence of reaching the next notification time (hour) set as the notification time interval using the timer 13 and the presence or absence of generating the vibration information using the acceleration sensor 14.

If the next notification time set as the re-notification setting is reached, the control unit 11 starts the notification operation again (repetition from step 15 to step 6 to step 8).

The above operation is the process in the vibration input mode.

Next, a process in the operation unit input mode will be described below.

First of all, if it is judged that the mode is the operation unit input mode at step 2 of FIG. 5, the control unit 11 performs the report function based on the operation unit input mode.

The control unit 11 starts timing with the timer 13 and monitors the detection of the presence or absence of reaching the set time (step 16).

If the set time is not reached, the control unit 11 continues the monitoring (NO at step 16), but if the report set time is reached (YES at step 16, hereinafter continuing to step 17 in FIG. 7), the control unit 11 performs the notification operation (step 17). At this time, since the control mode of the notification operation is the operation unit input mode, the control unit 11 monitors the input through the specific operation on the operation unit 9.

If the input through the specific operation from the operation unit 9 is not recognized, the control unit 11 continues the notification operation (NO at step 18), but if the input from the operation unit 9 is recognized (YES at step 18), the control unit 11 stops the notification operation (step 19).

Thereafter, the control unit 11 discriminates the presence or absence of the re-notification setting by referring to the RAM 5, and if there is no setting (NO at step 20), the report function is stopped (step 26), and the operation transfers to the standby state (END).

If there is the re-notification setting (YES at step 20), the control unit 11 monitors whether or not the set time specified for the notification time interval is reached using the timer 13 (step 21). If the set time is not reached (NO at step 22), the control unit monitors the presence or absence of the input through the specific operation from the operation unit 9, and if there is the input (YES at step 23), the control unit cancels the re-notification setting, and stops the report function at the same time (step 26).

On the other hand, if there is no input into the operation unit 9 (NO at step 23), the control unit 11 monitors the presence or absence of reaching the set time specified for the notification time interval again, using the timer 13 (step 22). Thereafter, if the set time specified for the notification time interval is reached (YES at step 22), the control unit performs the notification operation again (step 25), and monitors the input into the operation unit 9 during this time (step 18).

If the next notification time set as the re-notification setting is reached, the control unit 11 starts the notification operation again (repetition from step 25 to step 18 to step 19).

As described above, with the information communication terminal with the report function and the report function control method according to the exemplary embodiment of the invention, it is required to stop the report function by shaking the information communication terminal, and further generate the vibration under the predetermined conditions, whereby it is possible to provide the report function control method and the information communication terminal with the report function in which the control is easy for the user.

This application is the National Phase of PCT/JP2007/064097, filed Jul. 17, 2007, which claims the benefit of priority from Japanese patent application No. 2006-213359, filed on Aug. 4, 2006, the disclosure of which is incorporated herein in its entirety by reference.

BRIEF DESCRIPTION OF THE DRAWINGS

FIG. 1 is a block diagram showing a configuration example of an information communication terminal with an acceleration sensor according to an exemplary embodiment of the present invention;

FIG. 2 is a view showing a report function setting screen according to the exemplary embodiment of the invention, in which FIG. 2A is an image view showing a setting screen 16 for making various settings of the report function, and FIG. 2B is an image view showing the setting screen 16 for selecting a mode designating a control method for the notification operation;

FIG. 3 is an image view showing the operation and state for canceling the notification operation and re-notification setting during detection of vibration in the vibration input mode immediately after the set time according to the exemplary embodiment of the invention, in which FIG. 3A shows a setting pattern of stopping the notification operation and setting the re-notification, FIG. 3B shows a setting pattern of canceling the re-notification setting, and FIG. 3C shows a setting pattern of stopping the notification operation and stopping the report function in a state where there is no re-notification setting;

FIG. 4 is an image view showing the operation and state for canceling the notification operation and re-notification setting during detection of vibration in the vibration input mode immediately after the set time according to the exemplary embodiment of the invention, in which FIGS. 4A to 4C show the operation in various situations with the re-notification setting, and FIG. 4D shows the operation in the situation without the re-notification setting;

FIG. 7 is a flowchart showing the process for performing the report function, especially in the operation unit input mode, at the portable information communication terminal according to the exemplary embodiment of the invention.

Figure 2:
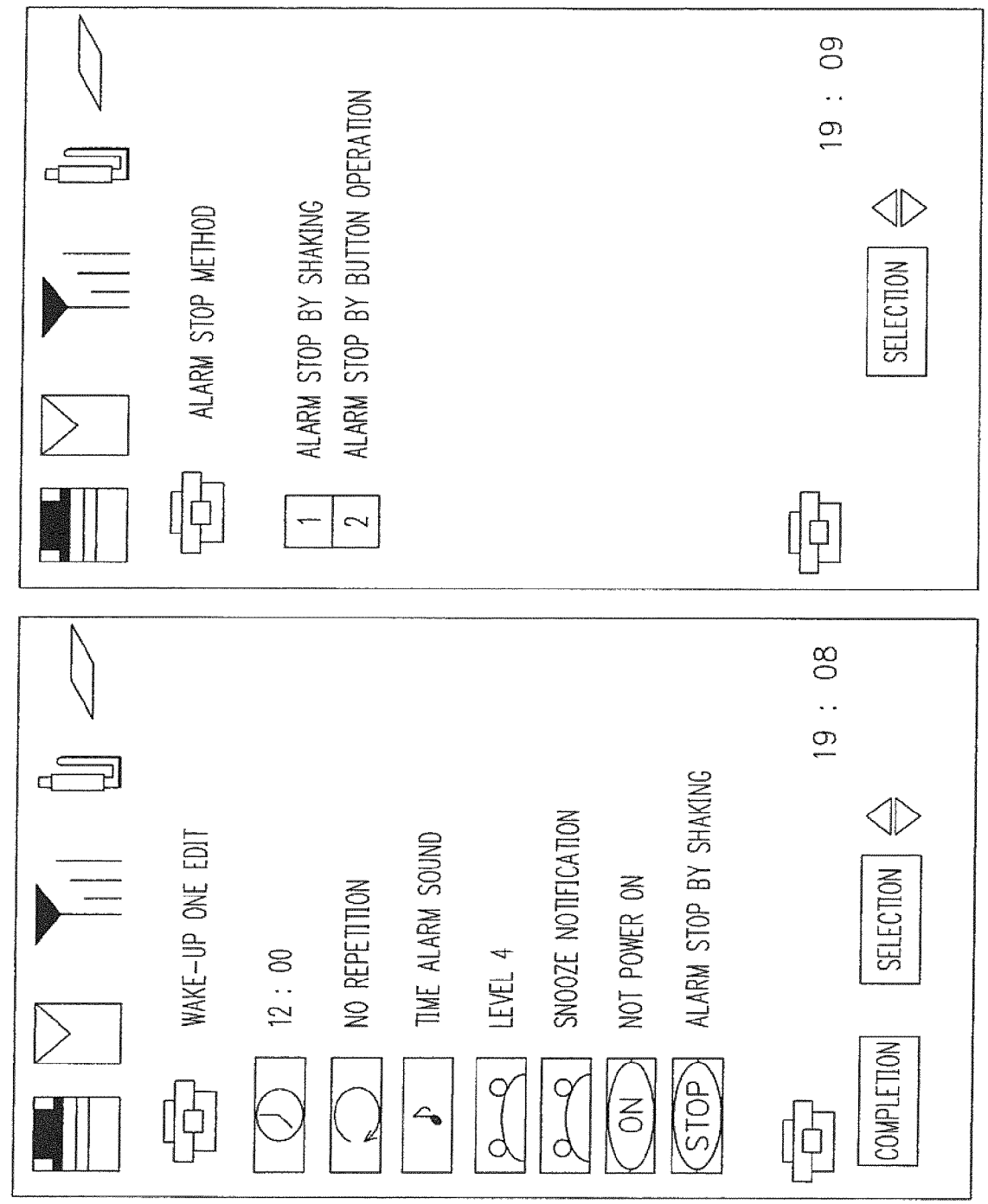
Figure 4:
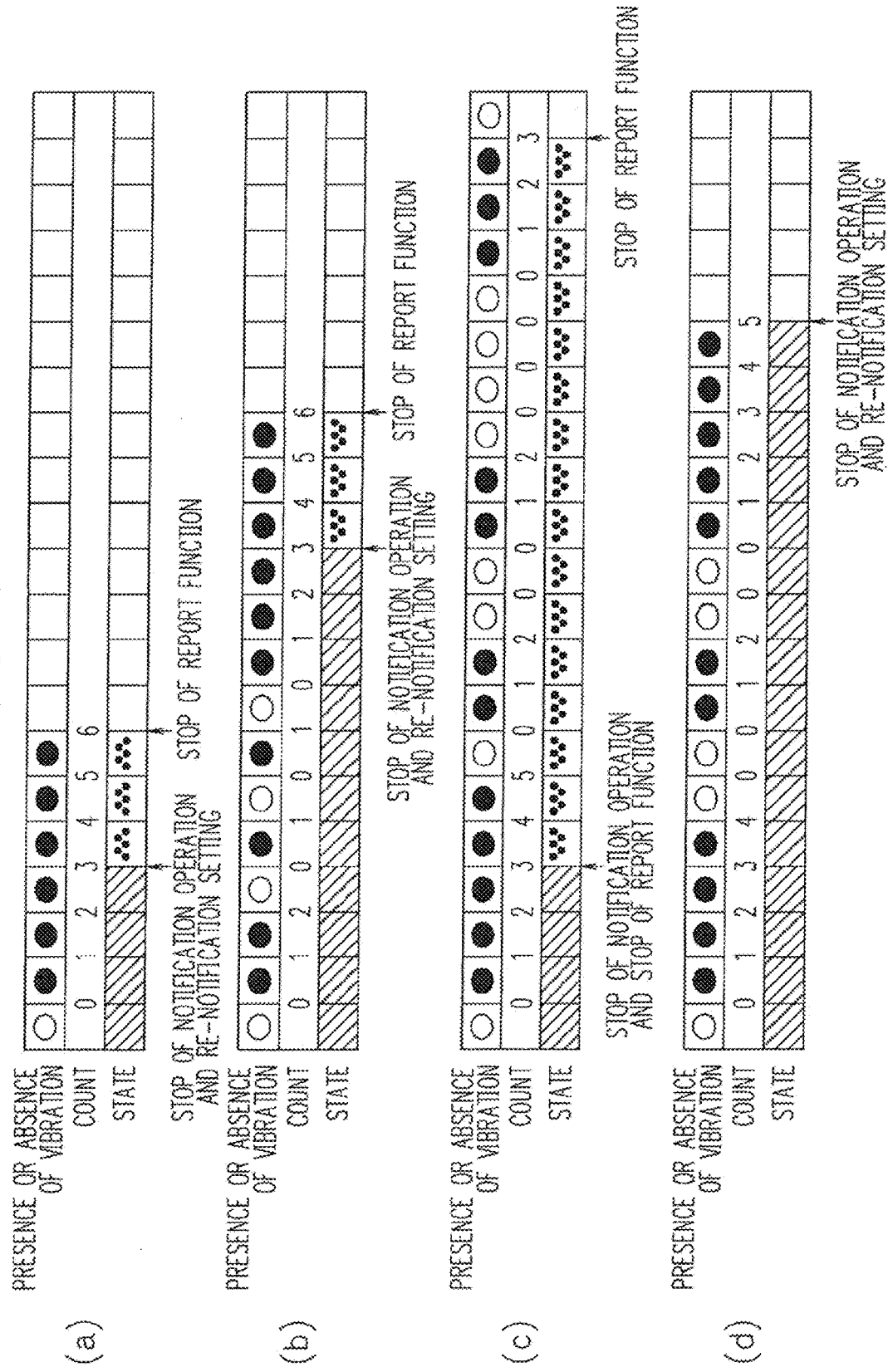
Figure 5:
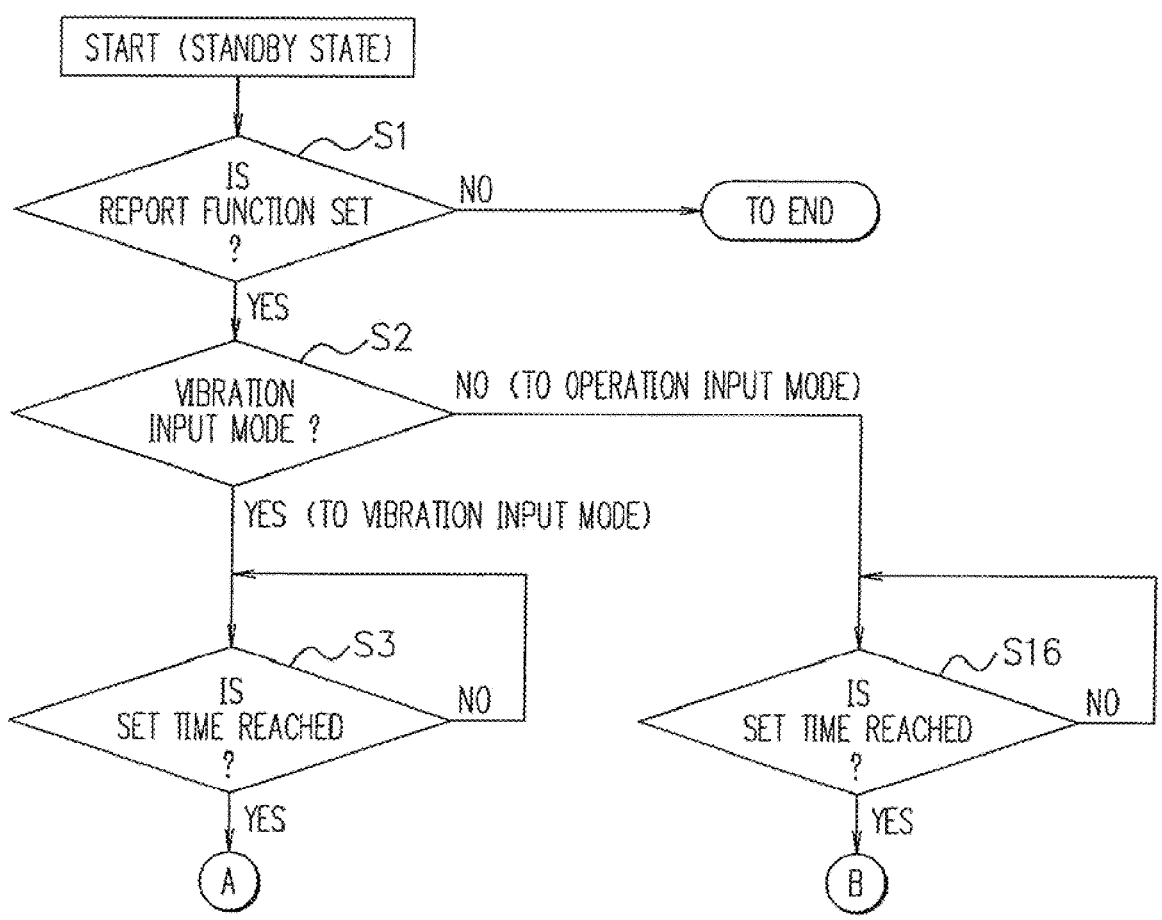
FIG. 5 is a flowchart showing a process for performing the report function, especially switching the mode, at a portable information communication terminal according to the exemplary embodiment of the invention.
Figure 6:
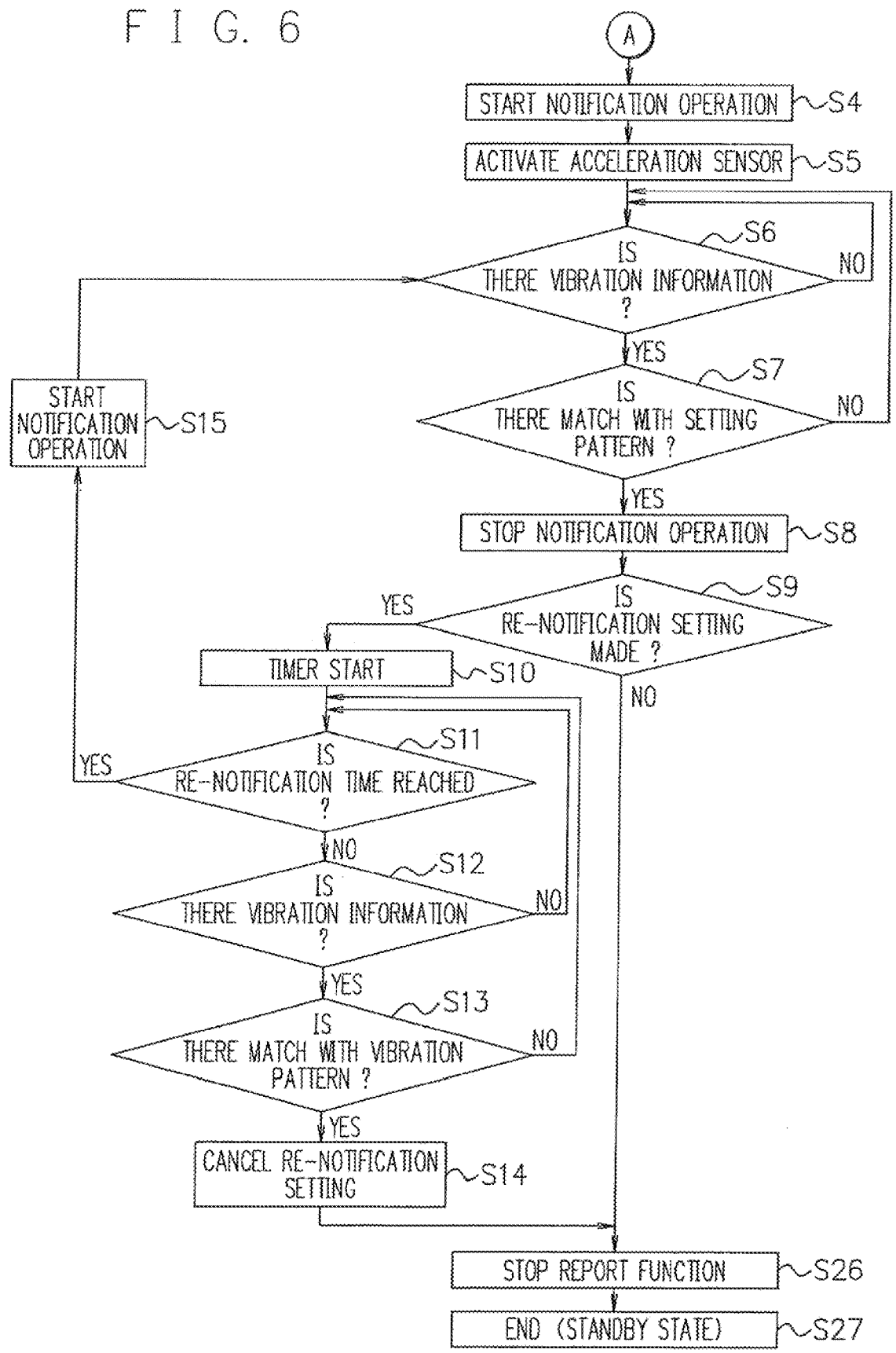
FIG. 6 is a flowchart showing the process for performing the report function, especially in the vibration input mode, at the portable information communication terminal according to the exemplary embodiment of the invention.

DESCRIPTION OF SYMBOLS 1 information communication terminal
2 voice processing unit
3 radio communication unit
4 antenna
5 RAM (memory)
6 ROM (memory)
7 speaker
8 microphone
9 operation unit
10 display unit
11 control unit
12 CPU
13 timer
14 acceleration sensor
15 vibrator
16 setting screen

The invention claimed is:

1. An information communication terminal comprising:
an acceleration detection means unit which detects vibration occurring on the information communication terminal to generate vibration information;
a timer which detects presence or absence of reaching a predetermined time;
a notification means unit which performs a predetermined notification operation at the predetermined time; and
a control means unit which controls the notification means unit by receiving the vibration information;
wherein the control moans unit receiving a notification of reaching the predetermined time from the timing moans timer instructs the notification means unit to perform the notification operation, and stops the notification operation based on the vibration information generated by the acceleration detection means unit during execution of the notification operation,
wherein the information communication terminal further comprises:
a storage unit which stores a setting pattern of the presence or absence of generating the vibration information for each partitioned time, in which the control unit compares a vibration pattern based on the vibration information generated by the acceleration detection unit during execution of the notification operation and the setting pattern stored in the storage unit, and if there is a match, stops the notification operation.

2. The information communication terminal according to claim 1, wherein the setting pattern includes a generation duration time of the vibration information.

3. The information communication terminal according to claim 1, wherein the control means unit transits to a re-notification setting state of repeating the notification operation again after a predetermined time after stopping the notification operation.

4. The information communication terminal according to claim 3, wherein the control unit cancels the re-notification setting based on the vibration information and the setting pattern during execution of the re-notification setting.

5. The information communication terminal according to claim 1, further comprising an operation unit and an input unit which sets a vibration input mode of stopping the notification operation based on the vibration information and an operation unit input mode of stopping the notification operation based on the input into the operation unit, in which the control unit detects beforehand the vibration input mode or operation unit input mode in stopping the notification operation, and detects the vibration information from the acceleration detection unit or information from the operation unit based on the detection result.

6. The information communication terminal according to claim 1, wherein the control unit controls to stop the notification operation and make the re-notification setting for performing the re-notification operation upon detecting a first vibration information, and cancel the re-notification setting upon detecting a second vibration information.

7. The information communication terminal according to, claim 1, wherein the control unit controls to stop the notification operation upon detecting a third vibration information.

8. A report function control method comprising:
for an information communication terminal with a sensor for detecting vibration occurring on the information communication terminal to generate vibration information, performing a notification operation as a report function when a predetermined time is reached;
stopping the notification operation if a control unit of the information communication terminal detects specific first vibration information during execution of the notification operation; and
stopping the notification operation if there is a match when the control unit compares a vibration pattern based on the vibration information generated during execution of the notification operation and a pre-stored setting pattern.

9. The report function control method according to claim 8, further comprising making the re-notification setting for performing the notification operation again after stopping the notification operation, and canceling the re-notification setting if the control unit detects the second vibration information after stopping the notification operation.

10. The report function control method according to claim 8, wherein the control unit controls the notification operation in accordance with a period of duration of the vibration information.

11. The report function control method according to claim 10, wherein the control of the notification operation is performed by selecting any of two modes, a vibration input mode using the vibration information detected by the sensor and an operation unit input mode using an operation unit provided for the information communication terminal, whereby the control unit monitors the sensor or the operation unit in accordance with the selected mode.

12. An information communication terminal comprising:
acceleration detection means for detecting vibration occurring on the information communication terminal to generate vibration information;
timing means for detecting presence or absence of reaching a predetermined time;
notification means for performing a predetermined notification operation at the predetermined time; and
control means for controlling the notification means by receiving the vibration information;
wherein the control means receiving a notification of reaching the predetermined time from the timing means instructs the notification means to perform the notification operation, and stops the notification operation based on the vibration information generated by the acceleration detection means during execution of the notification operation,
and wherein the information communication terminal further comprises:
storage means for storing a setting pattern of the presence or absence of generating the vibration information for each partitioned time, in which the control means compares a vibration pattern based on the vibration information generated by the acceleration detection means during execution of the notification operation and the setting pattern stored in the storage means, and if there is a match, stops the notification operation.

* * * * *